Figure 1:
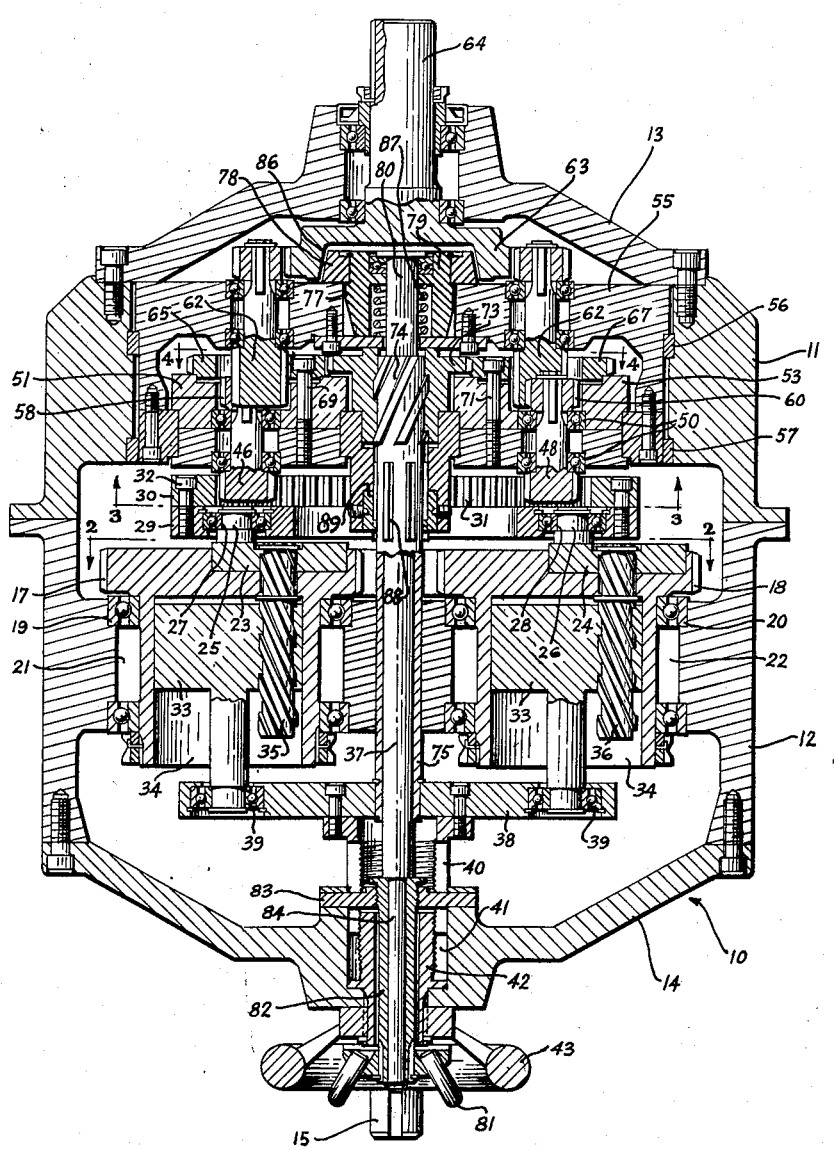

Sept. 29, 1953     LE ROY A. CREBER     2,653,491

VARIABLE DRIVE RATIO GEAR DRIVE TRANSMISSION

Filed June 11, 1952     3 Sheets-Sheet 1

Inventor
LEROY A. CREBER

Sept. 29, 1953     LE ROY A. CREBER     2,653,491
VARIABLE DRIVE RATIO GEAR DRIVE TRANSMISSION
Filed June 11, 1952     3 Sheets-Sheet 2

Inventor
LEROY A. CREBER
by: Fetherstonhaugh & Co.
Attys.

Sept. 29, 1953     LE ROY A. CREBER     2,653,491
VARIABLE DRIVE RATIO GEAR DRIVE TRANSMISSION Filed June 11, 1952     3 Sheets-Sheet 3

Inventor
LEROY A. CREBER

Patented Sept. 29, 1953

2,653,491

UNITED STATES PATENT OFFICE 2,653,491

VARIABLE DRIVE RATIO GEAR DRIVE TRANSMISSION

Le Roy A. Creber, Noroton Heights, Conn.

Application June 11, 1952, Serial No. 292,792

6 Claims. (Cl. 74—789)

This invention relates to a variable drive ratio gear drive transmission.

In the past there have been many attempts to provide a smoothly variable positive gear drive transmission but so far as I am aware all of such prior systems employ conical gearing wherein the range of adjustment is materially limited, and wherein the gear meshing problems are most unusual and often give rise to impractical devices. It is known that if a planetary motion can be given to an inner toothed ring gear where the motion is of relatively small eccentricity then the teeth of the ring gear can be meshed with a plurality of smaller gears arranged therewithin in intermittent and consecutive meshing relationship. However, prior concepts of a relationship of this kind have not invisaged any establishment of a mechanical relation between the particular eccentricity of motion of the ring gear and the particular position of the gears therewithin with which it is to mesh, either with one another or with the ring gear.

Accordingly, the present invention concerns that mechanism associated with an eccentrically moving ring gear and a cluster or array of gears driven thereby, wherein the driving of the array of gears as to drive ratio may be smoothly adjusted by mechanically interlinking their positions relative to a smooth mechanical adjustment of the eccentric motion of the ring gear.

In conjunction with the foregoing, the invention also contemplates the driving of an output shaft by the said cluster or array of gears in such manner that the cluster or array of gears are operatively related in their motion even though only one at a time may be fully engaged with the inner teeth of the ring gear.

In the case where apparatus of the invention is designed in such manner that the array or cluster of gears driven by the eccentric ring gear are always equidistant from the axis about which the ring gear moves in its eccentric or planetary path and the said array of gears are operatively related to an output shaft, means may be provided for restraining each of the gears of the said cluster against rotation whereby the cluster as a whole will rotate about said axis thereby permitting a different range of drive ratios to be accomplished.

The invention will be appreciated in more detail by reference to the following specification taken in conjunction with the accompanying drawings disclosing one preferred form of gear drive mechanism according to the invention, the discussion of which is intended not to be construed as limiting in any way as to the true nature of the invention concerned.

In the drawings:

Figure 1 is a sectional view of one preferred form of variable gear drive transmission according to the invention.

Figure 2:
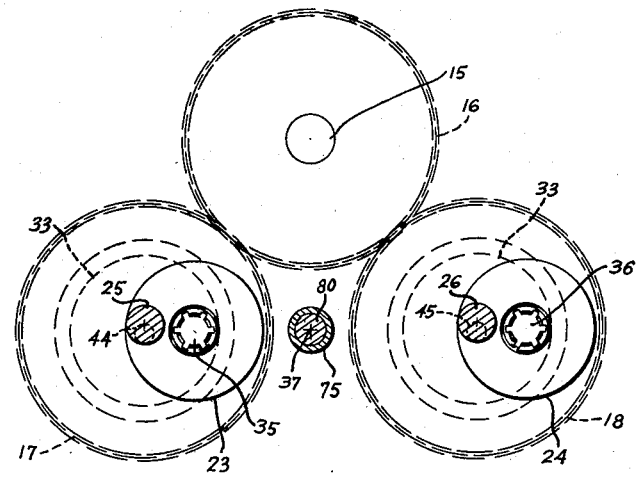
Figure 3:
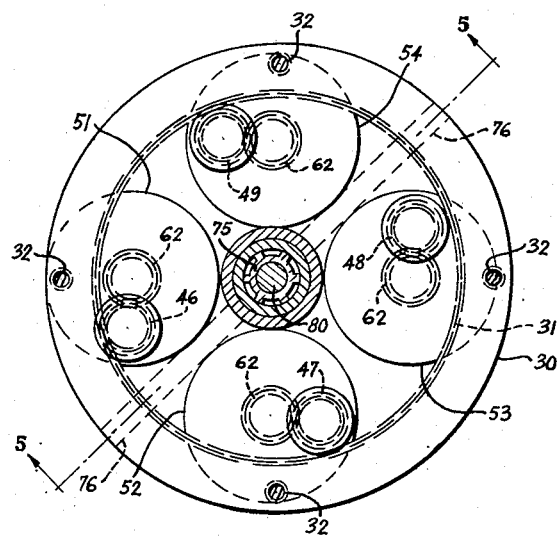
Figure 4:
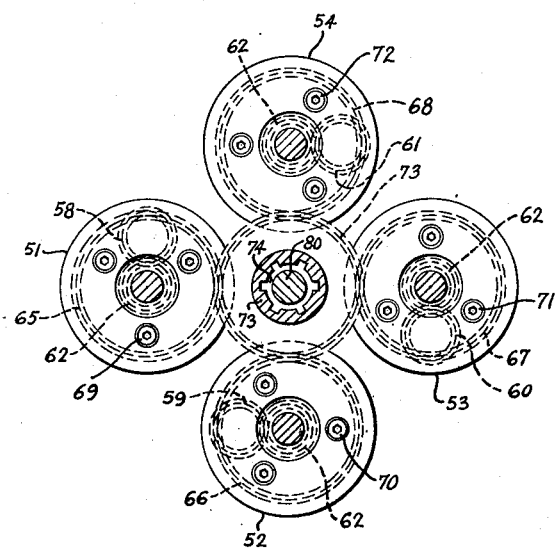
Figure 5:
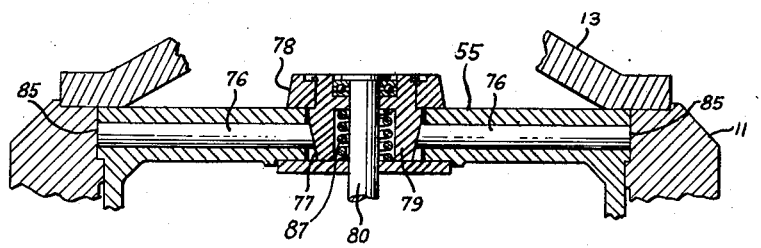

Figure 2 is a view on the line 2—2 of Figure 1.
Figure 3 is a view on the line 3—3 of Figure 1.
Figure 4 is a view on the line 4—4 of Figure 1.
Figure 5 is a view on the line 5—5 of Figure 3.

A variable drive transmission of the invention may be encased within a housing 10 formed of two main castings 11 and 12 having end caps 13 and 14 assembled together with any suitable means such as the screws shown.

An input shaft 15 passes through the end cap 14 of the housing by means of suitable bearings (not shown) and carries a gear 16 as shown in Figure 2, meshing with the two gears 17 and 18 mounted by bearings 19 and 20 in openings 21 and 22 in the housing part 12. Driving discs 23 and 24 are eccentrically and rotatably mounted within recesses in the gears 17 and 18 respectively, and carry pivot posts 25 and 26 carrying bearings 27 and 28 supporting a carrier ring 29 to which a ring gear 30 having inner teeth 31 is fastened by screws 32.

The drive discs 23 and 24 are adjustable to determine the eccentricity of the ring gear 30 by causing the adjusting plungers 33 within the chamber portions 34 of gears 17 and 18 to articulate with the spiral-toothed shafts 35 and 36 whereby the effective eccentricity of the posts 25 and 26 is determined with respect to the common axis of motion 37 of the mechanism. The plungers 33 are positioned by movement of a plate 38 connecting to the plungers by suitable bearings 39 and adjustable along the axis 37 by means of the threaded sleeve 40 slidable in the adjusting socket 41 of the end cap 14 and positionable by the male screw 42 rotatable by the hand wheel 43. As indicated in Figure 2, the posts 25 and 26 and hence the ring gear will have a motion as indicated by the chain lines 44 and 45 effectively planetary about the common axis 37 since the posts themselves will have their axes moving in a circular path about the axis of the gears 17 and 18. The eccentricity of the posts with respect to the axis of the gear in this case will determine the eccentricity of the ring gear 30, which eccentricity can be smoothly controlled by the rotatable adjustment of the drive discs 23 and 24 in the manner described.

The inner teeth 31 of the ring gear 30 consecutively fully mesh with the array or cluster of gears 46, 47, 48, and 49, which latter are rotatably carried in bearings 50 in rotatably adjustable cluster blocks 51, 52, 53 and 54 supported for rotatable adjustment in a carrier head 55 supported by bearings 56 and 57 in the housing part 11.

It will be evident from an examination of Figure 3 in particular that the cluster gears are supported eccentrically in each of the cluster blocks 51, 52, 53, 54 and in such manner that the upper pinion ends 58 (59) 60 (61) are disposed to mesh with the transfer gears 62 arranged about the common centre line 37 and meshing with the output gear 63 driving the output shaft 64. Observe that the cluster blocks are arranged concentrically with the axis of the transfer gears 62 and, accordingly, rotatable movement of the cluster blocks 51, 52, 53, 54 will maintain a meshing relationship of the cluster gears with the transmission gears so that the cluster gears will commonly rotate during rotation of the output gear 63 and output shaft 64.

The rotative adjustment of the cluster blocks 51, 52, 53, 54 is accomplished by adjusting gears 65, 66, 67, 68 thereon as illustrated in Figure 4, all arranged commonly with the cluster blocks 51, 52, 53, 54 and fastened thereto by screws 69, 70, 71, 72 equidistant from the common axis 37 and, therefore, positioned to mesh with the common adjusting gear 73 rotatable by a thrust screw 74 (Figure 1) formed on the hollow control shaft 75 extending from connection to the plate 38. Accordingly, advancing or retarding movement of the plate 38 for the purpose of adjusting the eccentricity of the ring gear 30 will likewise adjust the rotation of the gear 73 and the cluster adjusting gears 65, 66, 67, 68 thereby cooperatively accomplishing the desired arrangement of the cluster gears 46, 47, 48, 49 for the particular eccentricity of the ring gear.

In the position of the components illustrated in Figure 1, the carrier head 55 is restrained against rotation within the housing part 11 by a suitable braking or locking device such as the brake rods 76 illustrated in Figure 5 urged positively outwardly against the inner faces of the housing part 11 by means of the cam ring 77 under pressure from the clutch ring 78 supported by the spring-biased sleeve 79 on the clutch rod 80. When it is desired to obtain a low range of speeds, the clutch rod 80 is advanced by turning the secondary hand wheel 81, serving to rotate the rotatable sleeve 82 threaded through the fixed plate 83 and rotatably enclosing the reduced diametric portion 84 of the clutch rod. Accordingly, the clutch ring 78 is advanced along with the cam ring 77, whereby the friction of the brake rods 76 against braking surfaces 85 of the housing part 11 is reduced to allow rotation of the carrier head 55 within this housing part. Moreover, the clutch ring 78 is engaged within the clutch socket 86 of the output gear 63 thereby causing the carrier head 55 to move with the output gear and, accordingly, the cluster of transfer gears will no longer rotate on their own axes but will rotate only about the common axis 37. The action of the spring 87 biases the clutch ring 78 for engagement with the clutch socket 86, the clutch ring 78 being movable axially but fixed for rotation with the carrier head 55 by means of a suitable slidable pin (not shown).

The straight spline 88 formed on the control shaft 75, is adjustable in female splined sleeve 89 which prevents the control shaft from revolving except when the carrier head revolves.

It will be apparent that any braking system for the carrier head adaptable to lock it in fixed relation to the housing part 11 and of a nature operatively related to the secondary hand wheel 81 employed in engagement of the clutch ring 78 will accomplish the desired purpose in providing a low and high range variable speed drive gear transmission device of the class disclosed.

It is intended that the present disclosure should not be construed in any limiting sense other than that indicated by the scope of the following claims.

What I claim as my invention is:

1. A variable drive ratio gear drive transmission, comprising in combination: a housing; a carrier head mounted in said housing and carrying a plurality of transfer gears arranged equidistant about a common axis; an output gear driven by said transfer gears; an output shaft operatively related to said output gear; a cluster of gears, one for each of said transfer gears adapted to drive the latter, spaced at all times equidistant from said common axis; a cluster block supporting each cluster gear adjustably rotatable about the axis of the transfer gear driven by the cluster gear it mounts; means for simultaneously rotatably adjusting said cluster blocks to adjust the distance from each of said cluster gears to said common axis but maintaining said distance equal for all of said cluster gears; a ring gear having inner teeth operative consecutively with said cluster gears to drive the latter; an input shaft; and means driven by said input shaft providing a non-rotative planetary eccentric motion for said ring gear.

2. The combination claimed in claim 1 wherein the means providing eccentric motion for the ring gear comprises: a pair of gears driven by the input shaft and arranged equidistant from said common axis; a drive disc mounted in each of said pair of gears but rotatably mounted therein on a centre positioned a predetermined distance from the axis of rotation thereof; a post in each drive disc pivotally joined to said ring gear and providing eccentric motion of said ring gear about said common axis corresponding to the eccentricity of motion of each post about the axis of the gear carrying the drive disc thereof.

3. The combination claimed in claim 1, wherein the means providing eccentric motion for the ring gear comprises: a pair of gears driven by the input shaft and arranged equidistant from said common axis; a drive disc mounted in each of said pair of gears but rotatably mounted therein on a center positioned a predetermined distance from the axis of rotation thereof; a post in each drive disc pivotally joined to said ring gear and providing eccentric motion of said ring gear about said common axis corresponding to the eccentricity of motion of each post about the axis of the gear carrying the drive disc thereof; and means for rotatably adjusting each drive disc in its supporting gear to vary the eccentricity of motion of the ring gear.

4. The combination claimed in claim 1, wherein the means providing eccentric motion for the ring gear comprises: a pair of gears driven by the input shaft and arranged equidistant from said common axis; a drive disc mounted in each of said pair of gears but rotatably mounted therein on a centre positioned a predetermined distance from the axis of rotation thereof; a post in each drive disc pivotally joined to said ring gear and providing eccentric motion of said ring gear about said common axis corresponding to the eccentricity of motion of each post about the axis of the gear carrying the drive disc thereof; means for rotatably adjusting each drive disc in its supporting gear to vary the eccentricity of motion of the ring gear; and means operatively relating said adjusting means and the adjusting means determining the rotative adjustment of said cluster blocks.

5. Variable drive ratio gear drive transmission, comprising in combination: an input shaft and an output shaft; an inner toothed ring gear; means operative by said input shaft providing planetary motion of said ring gear about an axis contained therewithin and spaced from the centre of said ring gear an eccentric distance therefrom determining the drive ratio of the transmission; means for adjusting the eccentricity of motion of said ring gear about said axis; a plurality of transfer gears spaced equally from and about said axis and operatively related to said output shaft; an intermittently driven gear for each of said transfer gears adjustable about the axis of the latter but at all times spaced equidistant from said latter axis, being consecutively fully meshable with the inner teeth of said ring gear; and means operatively relating the means for adjusting the eccentricity of the ring gear and the rotatable adjustment of said intermittent gear.

6. A variable drive ratio gear drive transmission, comprising in combination: a housing; a carrier head mounted in said housing and carrying a plurality of transfer gears arranged equidistant about a common axis; an output gear driven by said transfer gears; an output shaft operatively related to said output gear; a cluster of gears, one for each of said transfer gears adapted to drive the latter, spaced at all times equidistant from said common axis; a cluster block supporting each cluster gear adjustably rotatable about the axis of the transfer gear driven by the cluster gear it mounts; means for simultaneously rotatably adjusting said cluster blocks to adjust the distance from each of said cluster gears to said common axis but maintaining said distance equal for all of said cluster gears; a ring gear having inner teeth operative consecutively with said cluster gears to drive the latter; an input shaft; means driven by said input shaft providing a non-rotative planetary eccentric motion for said ring gear; means rotatably mounting said carrier head in said housing; and means for fixing said carrier head against rotation within said housing whereby the transmission is capable of accomplishing two ranges of drive ratio: a very low range of drive ratio when the carrier head is unfixed in the housing, and a higher range when the carrier head is fixed.

LE ROY A. CREBER.

References Cited in the file of this patent

UNITED STATES PATENTS

| Number | Name | Date |
| --- | --- | --- |
| 1,844,503 | Green | Feb. 9, 1932 |
| 2,600,762 | Hartz | June 17, 1952 |